United States Patent [19]

Walsh

[11] Patent Number: 4,645,290
[45] Date of Patent: Feb. 24, 1987

[54] SELECTIVE COLOR FILTER

[75] Inventor: Peter J. Walsh, Stirling, N.J.

[73] Assignee: Duro-Test Corporation, North Bergen, N.J.

[21] Appl. No.: 569,739

[22] Filed: Jan. 10, 1984

[51] Int. Cl.⁴ .......................... G02B 5/22; G02B 5/28
[52] U.S. Cl. ................................. 350/1.7; 350/166; 313/112; 313/113
[58] Field of Search ............... 313/112, 113; 350/1.6, 350/1.7, 164, 166

[56] References Cited

U.S. PATENT DOCUMENTS

| Re. 27,743 | 9/1972 | Mauer | 350/1.7 |
| 4,017,661 | 4/1977 | Gillery | 350/1.7 |
| 4,160,929 | 7/1979 | Thorington et al. | 350/1.7 |
| 4,364,324 | 8/1982 | Yoldas | 350/1.7 |
| 4,368,945 | 1/1983 | Fujimori et al. | 350/1.7 |
| 4,556,599 | 12/1985 | Sato et al. | 350/166 |

Primary Examiner—Bruce Y. Arnold
Attorney, Agent, or Firm—Darby & Darby

[57] ABSTRACT

A filter for use in an incandescent lamp utilizing a transparent heat mirror coating on the lamp envelope for transmitting radiation in a selected portion of the visible range to produce a desired color and reflecting infra-red radiation back to the filament for increasing its temperature and thereby increasing its efficiency. The coating is preferably of the insulator/metal/inculator type having a layer of a metal sandwiched between two layers of an insulating material.

26 Claims, 6 Drawing Figures

SELECTIVE COLOR FILTER

BACKGROUND OF THE INVENTION

1. Field of the Invention

This invention pertains to the art of color filters and more specifically to an energy efficient color filter for producing illumination of a selected color in a lamp.

2. Description of the Prior Art

Conventional incandescent lamps for producing light of a particular color, for example, red, blue or green, are generally of several known types. The first uses a so called absorptive filter in which the desired color is produced by filters placed external to the lamp or by a finish applied directly to the lamp envelope, usually on the outside. The filters have an absorptive action, that is, they absorb light energy in the unwanted portion of the spectrum which is transformed into heat for reradiation. Energy of the desired wave length (color) is transmitted through the filter. These types of filters generally are of the organic type, e.g. paints, or possibly a silicon coating.

Another type of lamp for producing a selective color utilizes a multi-layer filter coating of a number of non-metallic films of low and high refractive indicies which are vaporized onto the glass envelope. Each layer of the coating is one quarter wave length thick, resulting in high reflectances at a particular wave length. Combinations of these layers of materials and their thicknesses produce a desired spectral distribution of transmitted light. In general, such coatings are called "dichroic filters" and have as many as 15 to 21 layers. Such lamps are disclosed, for example, in an article by Beesley entitled "New High Efficiency Color for PAR Lamps Using Multi Layer Interference Coatings" appearing in *Ilumination Engineering* March 1964 (pages 208-212).

Another type of color filter is described in U.S. Pat. No. 4,366,407 assigned to the assignee of the present invention and utilizes an "etalon" coating in which a thin film layer of an insulating material is located between two thin film layers of a metal, the coating being called a composite metal-insulator-metal coating. The thin films of the coating are formed on the wall of the incandescent lamp envelope with the thickness of the individual films of the coating and their interrelationship selected so as to maximize the coating transmission characterisitics to energy produced by the filament for a wavelength of a particular color in the visible range. Also, the color filter coating can be formed to maximize the reflecting properties to energy not desired to be transmitted including that in the infrared range, and in conjunction with an optically shaped envelope, reflect this energy back to the lamp filament to increase the lamp's efficiency.

SUMMARY OF THE INVENTION

The present invention relates to a color filter for producing a desired color of visible light formed of a metallic film sandwiched between two dielectric films. This color filter may be beneficially used with a lamp, such as an incandescent lamp and utilizes a composite coating of films of insulator/metal/insulator. The films of the composite insulator/metal/insulator coating are formed on the wall of the incandescent lamp envelope with the thickness of the individual films of the coating and their interrelationship selected so as to maximize the coating transition characteristics to energy produced by the filament of the wavelength of a particular color. Also, the coating may be formed to maximize the reflecting properties to visible energy not desired to be transmitted, and to energy in the infrared range. In conjunction with the envelope this energy may be reflected back to the filament to increase the efficiency of the lamp.

It is therefore an object of the present invention to provide a selective color filter for producing a desired color by the use of an insulator/metal/insulator coating.

It is a further object to provide an incandescent lamp for producing a desired color by the use of an insulator/metal/insulator coating.

An additional object is to provide an incandescent lamp for producing a selected color in the visible range, which lamp has a composite insulator/metal/insulator coating which transmits energy of the desired wavelength.

Another object is to provide an incandescent lamp for producing a selected color using an insulator/metal/insulator coating which reflects infrared energy back to the lamp filament to increase the operating efficiency of the lamp.

A still further object is to provide a lamp for producing a selected color using an insulator/metal/coating which reflects visible energy not desired to be transmitted back to an incandescent source to increase the operating efficiency of the lamp.

Other objects and advantages of the present invention will become more apparent upon reference to the following specification and the annexed drawings.

DETAILED DESCRIPTION OF THE PREFERRED EMBODIMENT

Figure 1:
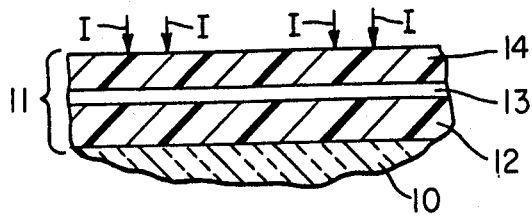
FIG. 1 is a side elevational view in section showing an insulator/metal/insulator coating in accordance with the present invention.

FIG. 1 shows a fragment of a substrate 10, for example, an incandescent lamp envelope of lime glass, or PYREX, or another suitable glass on which an insulator/metal/insulator coating 11 is laid down. The insulator/metal/insulator coating includes three discrete thin film layers, which are shown greatly magnified and not to scale. The first of these is a film layer 12 of a dielectric or insulator, such as titanium dioxide, magnesium fluoride, cryolite, etc., which is deposited on one surface of substrate 10. A thin film 13 of a highly electrically conductive, reflecting metal, such as silver, gold, copper or aluminum, is deposited on thin film layer 12 and an outer film layer 14 of a dielectric, which may be the same as the first film 12, is deposited on metal film 13. Any conventional and suitable technique can be used for depositing the three film layers, for example, chemical deposition, vapor deposition, sputtering, r.f. (radio frequency) sputtering, etc.

The three film layers are preferably made separate and discrete from each other. That is, it is preferred that there be no interdiffusion of the materials of the layers. As described below, however, the film layers cooperate and are interrelated as a composite coating to produce a filter having the desired transmission and reflection characteristics and they are hence designed as a composite.

In accordance with the subject invention, and as shown in FIG. 1, the envelope or substrate 10 is of a transparent material. When used in an incandescent lamp it is preferably of conventional glass used for lamp envelopes, e.g. lime glass. Any other suitable glass can be used, although as will be shown hereinbelow, substrate 10 and dielectric layer 12 should be selected so that phase of the transmitted visible energy is matched to the glass for final transmission from the envelope with little visible reflection at the desired color wavelength.

Incident radiation shown by the arrows I, assumed to have components in the visible portion of the spectrum as well as energy in the infrared portion of the spectrum, is shown as impinging upon layer 14 most remote from substrate 10. In accordance with the invention as described below, the coating transmits the maximum amount of energy in a particular desired and predetermined region of the visible portion of the spectrum so as to produce a desired color, for example, green, blue, yellow, red, etc. In addition, the coating is preferably designed to reflect a maximum amount of energy in the longer wavelength range including the infrared region, and thus behave as a heat mirror.

Figure 2:
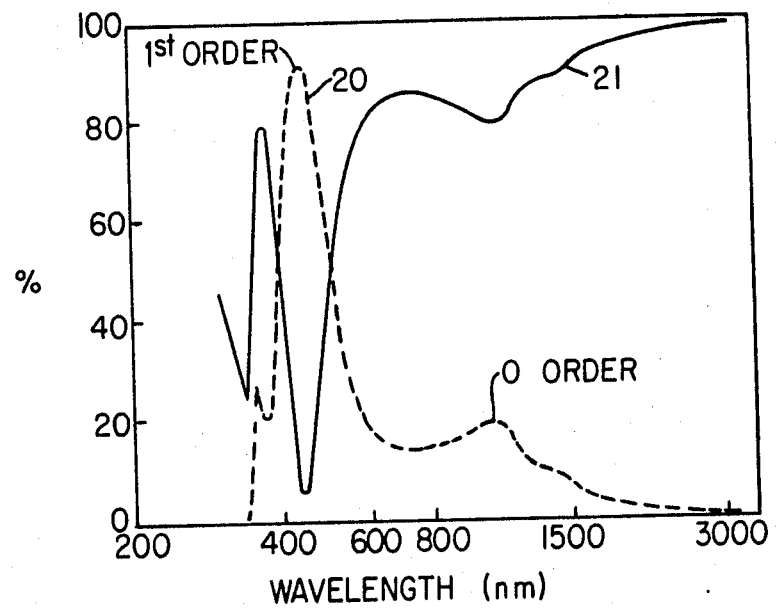
FIG. 2 is a graph showing the response characteristic of a preferred color filter according to the present invention.
Figure 3:
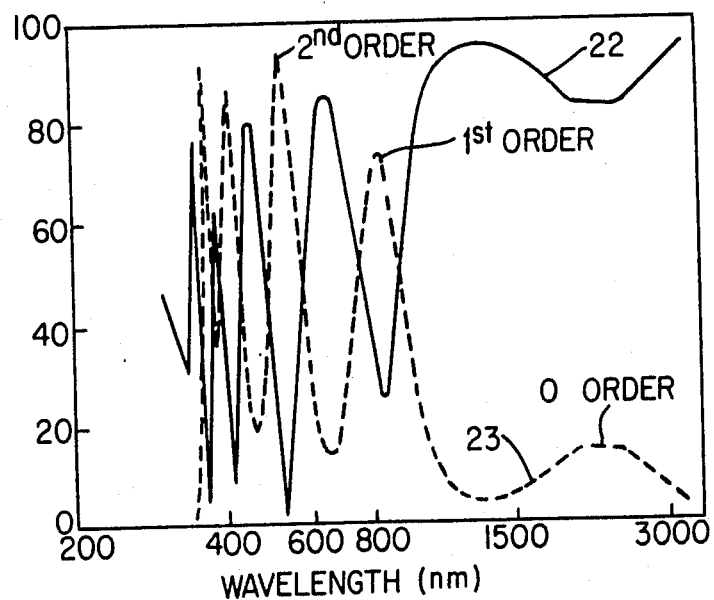
FIG. 3 is a graph illustrating the response characteristics of another preferred color filter according to the present invention.

FIGS. 2 and 3 show typical response curves for coatings of the type shown in FIG. 1. The ordinate shows transmission (curves 20 and 23) and reflectance (curves 21 and 22) characteristics. The abscissa shows the wavelength. As described further herein, depending on the relative thicknesses $l_1$, $l_2$, and $l_3$ of film layers 14, 13, and 12 respectively. The filter may have a single or several pass bands. These coatings are designed to be reflective in the infrared and transmissive at selected wavelengths.

The thickness of the layers 12 and 14 are selected to optimize the transmission of the selected color of visible energy, reflection of IR energy and light having colors not desired to be transmitted.

The silver film or layer 13 is optimized to increase the transmissivity of the desired color wavelength. The thickness of layers 12 and 14 are selected to be substantially equal. In a conventional insulator/metal/insulator film, such films may be designated as (0,0) films. The higher order films may then be designated (N,M) with the titanium dioxide layer next to the gas having N extra optical half wavelengths at the peak transmission wavelength and the titanium dioxide layer next to the glass having M extra optical half wavelengths at the peak wavelength. The optical half wavelength of a layer will be dependent upon its thickness and index of refraction.

The halfwidth $\Delta\lambda$ for a given transmission peak located at $\lambda_0$ is determined by finding the peak transmission value, $T_p$, at $\lambda_0$ and determining the wavelengths $\lambda_l$ and $\lambda_h$ of the points on either side of the peak having a transmissivity equal to $T_p/2$. The halfwidth is equal to the difference between the wavelengths $\lambda_l$ and $\lambda_h$.

As N and M are increased, the thicknesses of insulator layers increase and the visible pass band decreases in width resulting in a greater color saturation since the transmission color becomes more pure, i.e. more narrowly centered upon the wavelength of maximum transmission. When N equals M the two insulator layers have the same thickness if their deposited indicies of refraction are the same; when N does not equal M the layers are asymmetric.

The full half width of the insulator/metal/insulator filter decreases with increasing N and M and the narrowest half width for a given value of N and M. The narrowest half width for a given value of N+M will occur when N=M.

The color filter of the present invention operates by interference of light reflected at the interfaces between the different layers of the filter. The interference effects are chosen to center a transmission band on the wavelength, $\lambda_p$, appropriate to the desired transmission color and to produce a transmission pass band which gives the desired spectral purity.

As a rule of thumb, dielectric layer thicknesses are chosen as one eighth of an optical wave at $\lambda_p$ to form a (0,0) filter and the metal thickness is then chosen, preferably by Eq(1) below. This will produce a wide transmission band near the desired color wavelength. Successive extra optical half wavelength thicknesses of $\lambda_p$ are then added to produce an (N,M) filter whose bandpass yields the desired spectral hue and purity.

With the appropriate filter design, the amplitude of light reflected toward the filament at $\lambda_p$ interferes destructively with the amplitudes reflected at the interfaces between the lamp interior and dielectric layer 14 and between dielectric layer 12 and the envelope 10. High transmission then occurs at $\lambda_p$. As the wavelength changes from $\lambda_p$, the reflection interference becomes less destructive reducing light transmission outside the desired color range. In the infrared, the metal film becomes strongly reflective, assuring high return of radiation to the filament.

As previously described, an effective color filter according to the present invention may be designed by starting with a (0,0) metal/insulator/metal filter designed for the transmission of light centered around the desired color. The starting insulator and metal thicknesses are determined as follows:

The film dimensions designated $l_1$, $l_2$ and $l_3$ and corresponding to the thicknesses of layers 14, 13 and 12 respectively, are selected so that the filter transmissivity will peak at the particular color desired. In order to do so it will be necessary to adjust the thickness of the dielectric, $l_1$ and $l_3$ to obtain the color which, however, will normally not have a very high purity. The values of $l_1$ and $l_2$ may be designated as the fundamental thicknesses.

It can be mathematically shown that when the dielectric has a purely real dielectric constant, n, and the metal has a purely imaginary dielectric constant, ik, where $i=\sqrt{-1}$, and if n=k, the dielectric and metal (0,0) films have either of the following thickness combinations for complete transmission at the chosen wavelength, $\lambda_p$, corresponding to the desired transmission color:

$$l_1 = l_3 = \lambda_p/8n : \text{dielectrics} \quad (1)$$

$$l_2 = \frac{\lambda_p}{2\pi} \frac{1}{k} \text{ arc tanh } \frac{n^2 - n_0 n_3}{n^2 + n_0 n_3} : \text{metal}$$

or;

-continued
$$l_1 = \lambda_p/8n : \text{dielectrics} \quad (2)$$
$$l_1 = 3\lambda_p/8n$$

$$l_2 = \frac{\lambda_p}{2\pi} \frac{1}{k} \text{ arc tanh } \frac{n_3 - n_0}{n_3 + n_0} : \text{metal}$$

Where:
n is the index of refraction of light energy of the dielectric layer.
k is the index of absorption of the metal.
$n_o$ is the index of refraction of the gas in the envelope, which is substantially unity.
$n_3$ is the index of refraction of the glass envelope.
$l_1$ is the thickness of the dielectric layer closest to the light source.
$l_2$ is the thickness of the metal layer.
$l_3$ is the thickness of the dielectric layer furthest from the light source.

Since Eq(1) normally produces a greater metal thickness and thus higher infrared reflectivity, the use of conditions described by Eqs. (1) are preferable.

A higher order (N,M) film is then selected in which the dielectric thicknesses are M and N additional one-half optical wavelengths thicker than the fundamental thicknesses. The product of the thickness and the index of refraction of the dielectric equals the optical thickness.

It may be found that, as higher order films (N,M) are selected, more transmission in the infrared is obtained. It will generally therefore be preferred to start with a filter operating in the lowest transmission mode since such a filter shows only one transmission peak centered on the chosen wavelength. When a higher transmission mode is selected, the number of peaks will increase and this can lead to impurities in the transmitted color as shown for example in FIG. 3.

The selective color filter according to the present invention may be optimized to transmit selected frequencies within the visible range. In the table listed below filters derived according to the present invention using TiO2/Ag/TiO2 centered in the blue at approximately 435 nanometers, are shown.

| (N,M) | Titanium Dioxide | Silver | Titanium Dioxide |
|---|---|---|---|
| (0,0) | 23 | 22 | 23 |
| (0,1) | 23 | 23 | 108 |
| (1,0) | 107 | 26 | 23 |
| (1,1) | 107 | 22 | 107 |

The film designated (1,0) has a half width of 11 nanometers centered at 435 nanometers in the blue. Its responce is shown in FIG. 2 and includes curve 20 showing the transmission and curve 21 showing the reflectivity of such a film. It will be noted that there is a peak transmission centered at 435 nanometers corresponding to the first order interference mode. There is a second peak located at approximately 1200 nanometers corresponding to the zero th order interference mode.

As described below such color filter may be used as a coating on a lamp to give the lamp a colored output.

Compared to a typical lamp using a blue absorptive filter, a filter designed according to that shown in FIG. 2, will have a maximum transmission of 92% compared to a typical absorption transmission filter maximum transmission of 48%. Assuming a 10% extra absorption loss in mass produced filters, a blue filter having the characteristics shown in FIG. 2 will give 172% more lumens at a given filter temperature when used in a lamp as compared to an absorptive filament. When the infrared energy reflected by the filter described by FIG. 2 is redirected to the filament to conserve power needed to maintain the filament temperature, the filter of FIG. 2 is calculated to result in a lamp that produces 440% greater lumens per watt than allowed by an absorptive filter.

Similarly, as a second example, a green colored filter may be designed according to any of the examples given in the following table.

| (N,M) | Titanium Dioxide | Silver | Titanium Dioxide |
|---|---|---|---|
| (0,0) | 28 | 22 | 28 |
| (0,1) | 28 | 22 | 137 |
| (1,0) | 137 | 22 | 28 |
| (1,1) | 137 | 22 | 137 |
| (1,2) | 137 | 22 | 245 |
| (2,1) | 245 | 22 | 137 |
| (2,2) | 245 | 22 | 245 |

Referring to the filter designated as 2,2, its response is shown in FIG. 3 which again shows both reflectance and transmitance curves 22 and 23, respectively. This filter is a green filter centered at 520 nanometers and having 7.7 nanometer half width.

It will be observed that while the 2,2 film has a second order peak in the green centered at 520 nanometers, it further includes lower order peaks in the violet at approximately 410 nanometers, approximately 350 nanometers in the ultraviolet, 640 nanometers in the red, and 810 nanometers in the infrared. It will thus be clear that, although the output of this film will appear green, it will not have high spectral purity.

The calculated maximum transmission is approximately 92% compared to that for a green absorptive filter which is 43%. In mass produced filters, where maximum transmission may be 10% less than the calculated values, the increase in lumen color output over an absorptive green lamp is 170% at a given filament temperature. When the infrared is reflected back to the filament, the gain in lumens per watt are calculated as 380%.

These coatings have a relatively high reflectivity at selected frequencies as may be seen from FIG. 2 and 3, as well as having high transmissivities to the selected color for which the coating is designed. The transmissivity of the coatings are considerably more efficient than the prior art absorptive filters such as organic coatings which, as previously described, only absorb light and reradiate it as heat omnidirectionally. They have no capability of reflecting infrared radiation, or other undesireable radiation.

Figure 4:
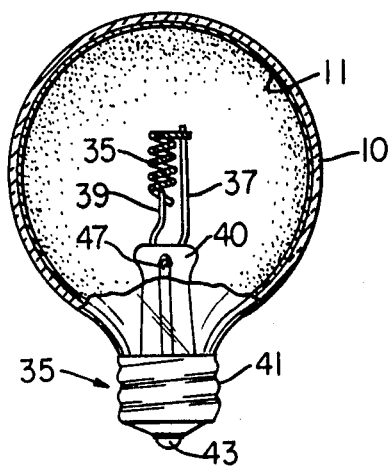
FIG. 4 is a diagram of an embodiment of a lamp in accordance with the invention.

Referring to FIG. 4, an incandescent lamp constructed with a filter according to the present invention is shown wherein the filter coating 11 is placed on the inner surface of substrate 10, which is the usual lamp envelope of a suitable glass material. The filters may be, for example, those described in association with FIGS. 2 and 3. The coating 11 is shown on the interior of the envelope although it can also be placed on the outside. A filament 35 of a suitable material such as plain or doped tungsten is mounted on a pair of lead in wires 37, 39 and held in an arbor or stem 40. The lead in wires 37, 39 are brought out to the arbor to electrical contacts 41, 43 on base 35. It also has a tubulation 47 through which the interior of the lamp is exhausted and filled, if desired with a gas. Suitable gases are, for example, argon, argon-nitrogen or a high molecular weight gas such as krypton.

Figure 5:
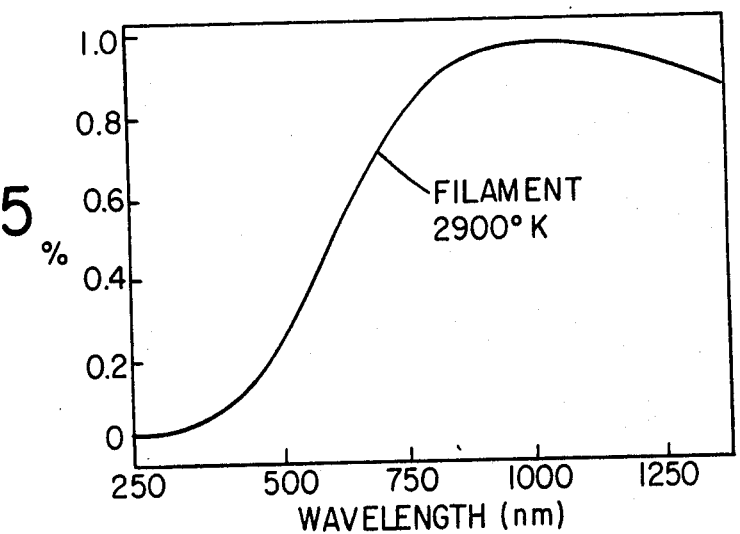
FIG. 5 is a diagram illustrating the spectral distribution characteristics of a typical incandescent lamp filament.

When voltage is applied to the lamp, the filament incandesces and produces energy in both the visible and infrared range. The exact spectral distribution of the filament depends upon its operating temperature, which in turn depends upon the resistance of the filament. Typical filament operating temperatures are in the range of about 2,650 K to about 2,900 K. FIG. 5 shows the spectral distribution of a typical filament operating at 2900° K. It emits light energy over a broad range of wavelengths ranging from below 500 nanometers in the ultra-violet to above 1500 nanometers in the infra-red. Visible energy is concentrated in the region between 350 nanometers to 750 nanometers. As the operating temperature decreases the spectral distribution shifts further to the red, i.e. it produces energy which includes more infrared radiation.

Such a lamp is conventional in construction except for the coating 11 which, as described above, is designed to transmit a particular color.

The lamp of FIG. 4 may provide further energy savings if it is constructed such that the infra-red energy not transmitted through the coating is reflected back onto the filament to raise its operating temperature and thereby decrease the power (watts) needed to heat the filament to the temperature at which its incandesces. This is done by shaping the envelope 10 as a reflector, that is, by making it spherical, ellipsoidal or of any other suitable optical shape, and locating the filament at the optical center of the envelope. The filament also can be located off center by a predetermined amount and a similar effect obtained. This is described in U.S. Pat. No. 4,249,101 which is also assigned to the assignee of the present invention. The filter must also reflect infra-red light. Referring to FIG. 2 and 3 it will be observed that these filters are highly reflective in the infra-red.

In some viewing applications for a lamp having a color output, the output is preferably directional. A typical application would be, for example, in an advertising sign or a traffic light. To accomplish this the previously described selective color producing lamp of FIG. 4 is coated on the interior or exterior of the envelope with a material which is highly reflective to both visible and infra-red energy, in the lower half section.

Figure 6:
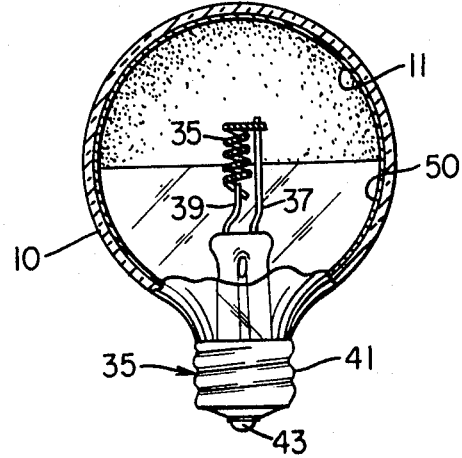
FIG. 6 is a diagram of a further embodiment of a lamp in accordance with the invention.

FIG. 6 shows a lamp utilizing this technique as applied to the subject invention. Here, the interior lower half of the lamp envelope adjacent to the base is coated with a material 50 such as silver of suitable thickness. The insulator/metal/insulator coating 11 is placed on the remaining portion of the envelope and operates as described hereinabove. If the envelope of the lamp of FIG. 6 is optically shaped and the filament properly placed, the IR energy is reflected back to the filament not only from the filter coating 11 but also from the silver coating 50. As described previously, this raises the operating temperature of the filament and increases the lamp efficiency. It should be understood that if reflection of IR energy back to the filament is not required, then the envelope need not be optically shaped to refocus energy onto the filament, but may be shaped, for example, to direct energy in a forward beam away from the base.

As should be apparent, a novel color filter coating for producing predetermined colors of light by the use of a novel selective color filter has been provided, which reflects unwanted light colors and transmits desired colors. The coating may be beneficially used with an incandescent or other type of lamp for providing illumination of a preselected color. The coating is relatively simple to place on the lamp and can be placed on either the inside or the outside of the lamp envelope. The lamp also may be designed to have infra-red energy produced by the filament reflected back to it, thereby increasing lamp efficiency.

What is claimed is:

1. An optical color filter for selectably transmitting electromagnetic energy of a predetermined band of wavelengths to transmit a predetermined color, comprising a discrete film of metal ranging in thickness from 22 to 26 nanometers sandwiched between two discrete films of a dielectric material, each ranging in thickness from 23 to 245 nanometers, the combination of thicknesses of said metal and two films of dielectric material being chosen for transmitting therethrough said light of a predetermined color, wherein the transmission characteristic of the coating has at least one band centered at a selected wavelength, said coating transmitting visible light in a selected region located at the center of the transmission band having visible transmissivity and transmission band width, $\Delta\lambda$, of less than about 50 nm.

2. The filter according to claim 1 wherein the transmission characteristic of the coating has a plurality of peaks, each centered at a different wavelength.

3. The filter according to claim 2 wherein said first and second dielectric layer have a fundamental thickness of $\frac{1}{8}$ of an optical wave of said selected wavelength.

4. The filter as in claim 2 wherein one peak has the highest transmissivity and it occurs in the region of green light.

5. The filter according to claim 2 wherein said metallic layer is selected from the group consisting of copper, gold, silver and aluminum.

6. The filter as in claim 2 wherein said dielectric material is selected from the group consisting of titanium dioxide, magnesium flouride and cryolite.

7. The incandescent lamp according to claim 6 wherein the thicknesses of said layers of dielectric and metal are selected from the group of thicknesses in nanometers consisting of:

| Titanium Dioxide | Silver | Titanium Dioxide |
| --- | --- | --- |
| 28 | 22 | 28 |
| 28 | 22 | 137 |
| 137 | 22 | 28 |
| 137 | 22 | 137 |
| 137 | 22 | 245 |
| 245 | 22 | 137 |
| 245 | 22 | 245 |

8. The filter according to claim 1 wherein the thicknesses of said layers of dielectric and metal are selected from the group of thicknesses in nanometers consisting of:

| Titanium Dioxide | Silver | Titanium Dioxide |
| --- | --- | --- |
| 23 | 22 | 23 |
| 23 | 23 | 108 |
| 107 | 26 | 23 |
| 107 | 22 | 107 |

9. An incandescent electric lamp for producing visible light of a selected wavelength bandwidth having a predetermined color comprising:

an envelope of material which is transmissive to energy in the visible range;

filament means within said envelope which incandesces in response to electrical current applied thereto to produce radiant energy in both the visible and infra-red regions;

means for supplying electrical current to said filament means; and a coating on said envelope formed of a discrete film of a metal chosen to have a thickness in the range from 22 to 26 nanometers, sandwiched between two discrete films of a dielectric material each having a thickness in the range of 23 to 245 nanometers, said films forming a composite filter for transmitting therethrough energy over only a selected portion of the normal visible range of energy produced by said filament to provide a light output of distinct color from said lamp.

10. The lamp according to claim 9 wherein said first and second dielectric films have a fundamental thickness of ¼ of an wavelength of said predetermined wavelength.

11. An incandescent electric lamp according to claim 10 wherein said metal is selected from the group consisting of copper, gold, silver and aluminum.

12. The incandescent electric lamp as in claim 11 wherein said dielectric material comprises titanium dioxide.

13. The incandescent lamp according to claim 12 wherein the thicknesses of said layers of dielectric and metal are selected from the group of thicknesses in nanometers consisting of:

| Titanium Dioxide | Silver | Titanium Dioxide |
| --- | --- | --- |
| 23 | 22 | 23 |
| 23 | 23 | 108 |
| 107 | 26 | 23 |
| 107 | 22 | 107 |

14. The incandescent lamp according to claim 12 wherein the thicknesses of said layers of dielectric and metal are selected from the group of thicknesses in nanometers consisting of:

| Titanium Dioxide | Silver | Titanium Dioxide |
| --- | --- | --- |
| 28 | 22 | 28 |
| 28 | 22 | 137 |
| 137 | 22 | 28 |
| 137 | 22 | 137 |
| 137 | 22 | 245 |
| 245 | 22 | 137 |

-continued

| Titanium Dioxide | Silver | Titanium Dioxide |
| --- | --- | --- |
| 245 | 22 | 245 |

15. An incandescent lamp as in claim 10 wherein the transmission characteristic of the coating has a plurality of bands each centered at a different wavelength, said coating transmitting visible light in a selected region located at the center $\lambda_p$ of the transmission band having the highest visible transmissivity with a transmission bandwidth of $\Delta\lambda$, less than 50 nm.

16. An incandescent lamp as in claim 15 wherein said transmission band has a peak in the region of green light.

17. An incandescent lamp according to claim 16 wherein said peak occurs at 520 nanometers and has a halfwidth of 7.7 nanometers.

18. An incandescent lamp as in claim 10 wherein transmission characteristic of the coating has a peak in the region of blue light.

19. The incandescent lamp according to claim 18 wherein said peak occurs at 440 nanometers and has a halfwidth of 6 nanometers.

20. An incandescent lamp as in claim 9 wherein said coating is reflective to energy in the infra-red range, said envelope being optically shaped and said filament located with respect to said envelope such that infra-red energy which impinges on the envelope is reflected back to the filament.

21. An incandescent lamp as in claim 9 wherein the transmission characteristic of the coating has a plurality of peaks each centered at a different wavelength, said coating transmitting visible light in a selected region located at the center $\lambda_0$ of the transmission band having high visible transmissivity with a transmission bandwidth, $\Delta\lambda$, less than 50 nm.

22. An incandescent lamp as in claim 21 wherein said coating is reflective to infrared energy, said envelope being optically shaped and said filament located with respect to said envelope such that infrared energy which impinges on the envelope is reflected back towards the filament.

23. An incandescent lamp as in claim 22 wherein a peak occurs in the region of blue light.

24. The incandescent lamp according to claim 23 wherein a peak occurs at 440 nanometers and has a halfwidth of 6 nanometers.

25. An incandescent lamp as in claim 22 wherein one peak has the highest transmissivity and it occurs in the region of green light.

26. An incandescent lamp according to claim 25 wherein one peak has the highest transmissivity and it occurs at 520 nanometers and has a halfwidth of 7.7 nanometers.

* * * * *